United States Patent
Lawrence et al.

(10) Patent No.: US 6,993,788 B1
(45) Date of Patent: Jan. 31, 2006

(54) METHOD AND SYSTEM FOR MANIPULATING BROADCAST SIGNALS

(75) Inventors: Lee G. Lawrence, Denver, CO (US); J. Clarke Stevens, Broomfield, CO (US)

(73) Assignee: MediaOne Group, Inc., Englewood, CO (US)

( * ) Notice: Subject to any disclaimer, the term of this patent is extended or adjusted under 35 U.S.C. 154(b) by 0 days.

(21) Appl. No.: 09/378,674

(22) Filed: Aug. 20, 1999

(51) Int. Cl.
   *H04N 7/173* (2006.01)

(52) U.S. Cl. .................................. 725/102; 725/88

(58) Field of Classification Search ................ 345/327; 209/219, 217; 348/6, 7, 10, 12, 13, 714; 725/101, 102, 103, 104, 97, 98, 91–94, 87, 725/88; 386/46, 68, 124; G06F 3/00, 13/00, G06F 15/16; H04N 7/10, 7/14, 9/64
   See application file for complete search history.

(56) References Cited

U.S. PATENT DOCUMENTS

| | | | |
|---|---|---|---|
| 5,357,276 A | | 10/1994 | Banker et al. |
| 5,371,551 A | * | 12/1994 | Logan et al. ............... 348/714 |
| 5,477,263 A | | 12/1995 | O'Callaghan et al. |
| 5,548,340 A | | 8/1996 | Bertram |
| 5,555,277 A | * | 9/1996 | Lawrence et al. .......... 375/346 |
| 5,594,491 A | | 1/1997 | Hodge et al. |
| 5,608,448 A | | 3/1997 | Smoral et al. |
| 5,682,597 A | * | 10/1997 | Ganek et al. ............... 725/101 |
| 5,790,174 A | * | 8/1998 | Richard, III et al. ......... 725/99 |
| 5,832,287 A | * | 11/1998 | Atalla ......................... 709/231 |
| 5,873,022 A | * | 2/1999 | Huizer et al. ............... 725/100 |
| 5,940,738 A | * | 8/1999 | Rao ............................ 725/103 |
| 5,956,488 A | * | 9/1999 | Suzuki ........................ 709/219 |
| 6,005,564 A | * | 12/1999 | Ahmad et al. .............. 715/723 |
| 6,195,726 B1 | * | 2/2001 | Hogan ......................... 711/112 |

OTHER PUBLICATIONS

Something is about to change about the way you watch TV, TIVO, Inc., Sunnyvale, CA.
Replay TV will absolutely, unequivocally shatter the myth that you have to watch television according to someone else's clock. Replay Networks, Inc., Palo Alto, CA.

\* cited by examiner

*Primary Examiner*—Vivek Srivastava
(74) *Attorney, Agent, or Firm*—Brooks Kushman P.C.

(57) ABSTRACT

A method and system for manipulating a broadcast signal utilizes a sliding-window time range multicast or a buffered storage queue at the headend. Multiple streams are available to the end user, which each stream originating from a corresponding different playback point in the sliding-window time range or headend buffered storage queue.

7 Claims, 2 Drawing Sheets

METHOD AND SYSTEM FOR MANIPULATING BROADCAST SIGNALS

TECHNICAL FIELD

The present invention relates to methods and systems for manipulating broadcast signals.

BACKGROUND ART

Although there have been many advances in the cable television (CATV) industry, the cable industry is still in its infancy. Generally, all of the cable programming originates at the headend or headend server. The headend receives programming information from a variety of sources. For example, there may be a satellite dish bar, antennas, in addition to landlines, all connected to the headend as programming sources.

The headend takes all of this television programming data, arranges the information within the available bandwidth, and sends the signal out to a plurality of hubs. The signal continues to branch out, possibly through nodes in the neighborhood, and eventually reaches a large group of end users. In traditional architectures, many one-way amplifiers are used between the headend and the destinations (business/ residence).

Because the cable industry is a rapidly growing industry, it is desired by many cable operators to upgrade their network to a hybrid fiber coax (HFC) network. An HFC network employs both fiber and coax. Fiber is the network backbone, with optoelectric conversion taking place somewhere between the headend and the destination, with the last leg of the signal path being over coax. The HFC network allows a cable company to utilize much of its coax that already exists within the neighborhood, while providing the advantages of fiber from the headend to the neighborhood, in a fiber-to-the-neighborhood (FTTN) arrangement. Accordingly, the many amplifiers that were needed along the coax between the headend and the neighborhood are no longer needed when fiber is employed, and the only amplifiers that remain are in the last leg which is still carried by coax.

Further, in addition to upgrading the distribution medium, cable operators have started to provide data services. Because the network was originally designed for downstream transmissions only, some cable companies require the upstream communication to take place along a phone line, while the cable network is used for downstream signals only. Other cable companies have used various techniques to allow upstream transmissions over the cable network.

In addition to upgrading the network and providing new services such as data services, the end customers desire greater functionality than that provided by the traditional television signal distribution from the headend. As such, some cable companies have attempted to make television programming available to the end customer upon request. For example, pay-per-view channels are often provided by the cable company. That is, a particular movie may begin at several different times staggered throughout the evening, so that a customer may order the movie (pay for the viewing) and not have to wait more than maybe half an hour before the next broadcast of the movie begins. Pay-per-view services, since their beginning several years ago, have become quite popular.

On the customer's side, there is a demand for a device that has more advanced capabilities than a traditional video cassette recorder (VCR). That is, although the VCR has found a place in many homes, many customers do not like the hassle of programming their VCR each time they would like a show recorded. In response to this customer need, some companies have started to introduce smart recorders. A smart recorder has some ability to download a programming guide over, for example, an analog phone line, and then automatically record several hours of programming based on pre-programmed customer preferences that are entered into the device by the customer. As such, the device attempts to record programming that the end customer prefers, without requiring the customer to repeatedly program the device other than initially setting his or her preferences in the memory of the device.

Although these smart recorders are providing a very useful service to the end customer that is dissatisfied with traditional cable broadcasting methods and existing video cassette recorder (VCR) technologies, these devices are still very expensive. With the expense of a single unit, the aggregate expense associated with providing these devices to an entire neighborhood or perhaps an entire area served by a headend is undesirably very costly. For the foregoing reasons, there is a need for a broadcasting technique that provides enhanced capabilities at the customer end, while providing the economy of scale and eliminating expensive requirements for the customer.

DISCLOSURE OF INVENTION

It is, therefore, an object of the present invention to provide a method and system for manipulating a broadcast signal that makes multiple streams available to the end customer by broadcasting a sliding-window time range of the signal and/or utilizing a headend buffered storage queue.

In carrying out the above object, a method for manipulating a broadcast signal is provided. The method comprises receiving the signal at a headend, and establishing a sliding-window time range of the signal. The sliding-window time range of the signal slides at a playback rate as the signal is received at the headend. The method further comprises transmitting at least two streams from the headend, the at least two streams being derived from the signal, with each stream originating from a corresponding different playback point in the sliding-window time range.

In one embodiment, substantially all of the sliding-window time range of the signal is transmitted from the headend to form a substantially continuous range of streams. Alternatively, any number of streams having originating playback points spread out over the window may be transmitted to allow forward and backward stepping through the streams by the end customer.

In one embodiment, the at least two streams have a destination, and the method further comprises receiving the at least two streams at the destination and playing the desired stream at the destination. The desired stream is played at the destination in response to a user at the destination selecting the desired stream from the at least two stream. In another embodiment, the method further comprises receiving the at least two streams at an intermediate device, and playing the desired stream at the destination. In response to a user at the destination selecting the desired stream from the at least two streams, the desired stream is unicasted from the intermediate device to the destination. The selection may be indicated with a pointer type variable stored in a device at the customer site.

It is to be appreciated that the economy of scale may be provided by multicasting the at least two streams from the headend. The at least two streams may be multicasted all the way to the destination, with the end customer selecting the desired stream at the destination. In the alternative, the at least two streams may be multicasted from the headend to intermediate devices. The end customer communicates with the intermediate device, and a desired stream for each user is unicasted to that user from the intermediate device. That is, the sliding-window time range of the signal, instead of being multicasted all the way to the end user, is multicasted all the way up until the last leg of the communication path, where desired streams are unicasted to corresponding customers based on their stream selections.

Embodiments of the present invention may be implemented to provide features such as pause, rewind, and fast-forward. For example, in response to a user at the destination requesting to pause, the current stream may be incrementally switched to a different stream of the at least two streams that originates earlier in the sliding-window time range than the current stream. The incremental switching would take place at such a rate to cause the playback point to remain substantially stationary in time. On the other hand, rewind is achieved by incrementally switching the stream at such a rate to cause the playback point to move backward in time. Accordingly, fast-forward is achieved by incrementally switching the current stream to a different stream of the at least two streams that originates later in the sliding-window time range than the current stream. The incremental switching for fast-forward takes place at such a rate to cause the playback point to move forward in time.

Still further, an implementation of the present invention may also employ a buffered storage queue at the destination. This effectively provides two levels of sliding-windows. That is, the user selects a stream out of the sliding-window at the headend, and then is able to select a desired position in the buffered storage queue at the destination. As such, the buffered storage queue of the destination may allow short movements in time, while the sliding-window at the headend allows gross movement in time.

Further, in carrying out the present invention, a method for manipulating a broadcast signal is provided. The method comprises receiving the signal at a headend, establishing a buffered storage queue at the headend that receives the signal, and transmitting a stream from the headend. The stream is derived from the signal and originates from a user selected playback point in the buffered storage queue. It is appreciated that in this embodiment, multicasting from the headend is eliminated and the desired stream is unicasted to the end user from the headend. In this embodiment of the present invention, in a manner similar to the other embodiment, pause, rewind and fast-forward features may be provided, in addition to providing a second buffered storage queue at the destination so that there is effectively two storage queues (providing the sliding-window functionality on two levels).

Still further, in accordance with the present invention, a system for manipulating a broadcast signal is provided. The system comprises a headend for receiving the signal. The headend is operative to establish a sliding-window time range of the signal that slides at a playback rate as the signal is received. The headend is further operative to transmit at least two streams from the headend. The at least two streams are derived from the signal, and each stream originates from a corresponding different playback point in the sliding-window time range.

Even further, in carrying out the present invention, a system for manipulating a broadcast signal is provided. The system comprises a headend for receiving the signal. The headend is operative to establish a buffered storage queue at the headend. The headend is further operative to transmit a stream from the headend, with the stream being derived from the signal. The stream originates from a user selected playback point in the buffered storage queue.

The advantages associated with the embodiments of the present invention are numerous. For example, embodiments of the present invention enable the end user to suspend watching a live broadcast and then continue without missing anything, fast-forward past commercials or skim content, create their own instant replays for exciting parts or missed dialog, and/or pause to capture video stills without missing any of the show. Still further, the embodiments of the present invention provide the economy of scale by eliminating the need to place a device at every customer residence. That is, integrating functionality into the headend may eliminate the requirement of a custom set top box. Further, the economy of scale achieved varies depending on where the unicasting takes place (straight from the headend, or from intermediate devices).

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
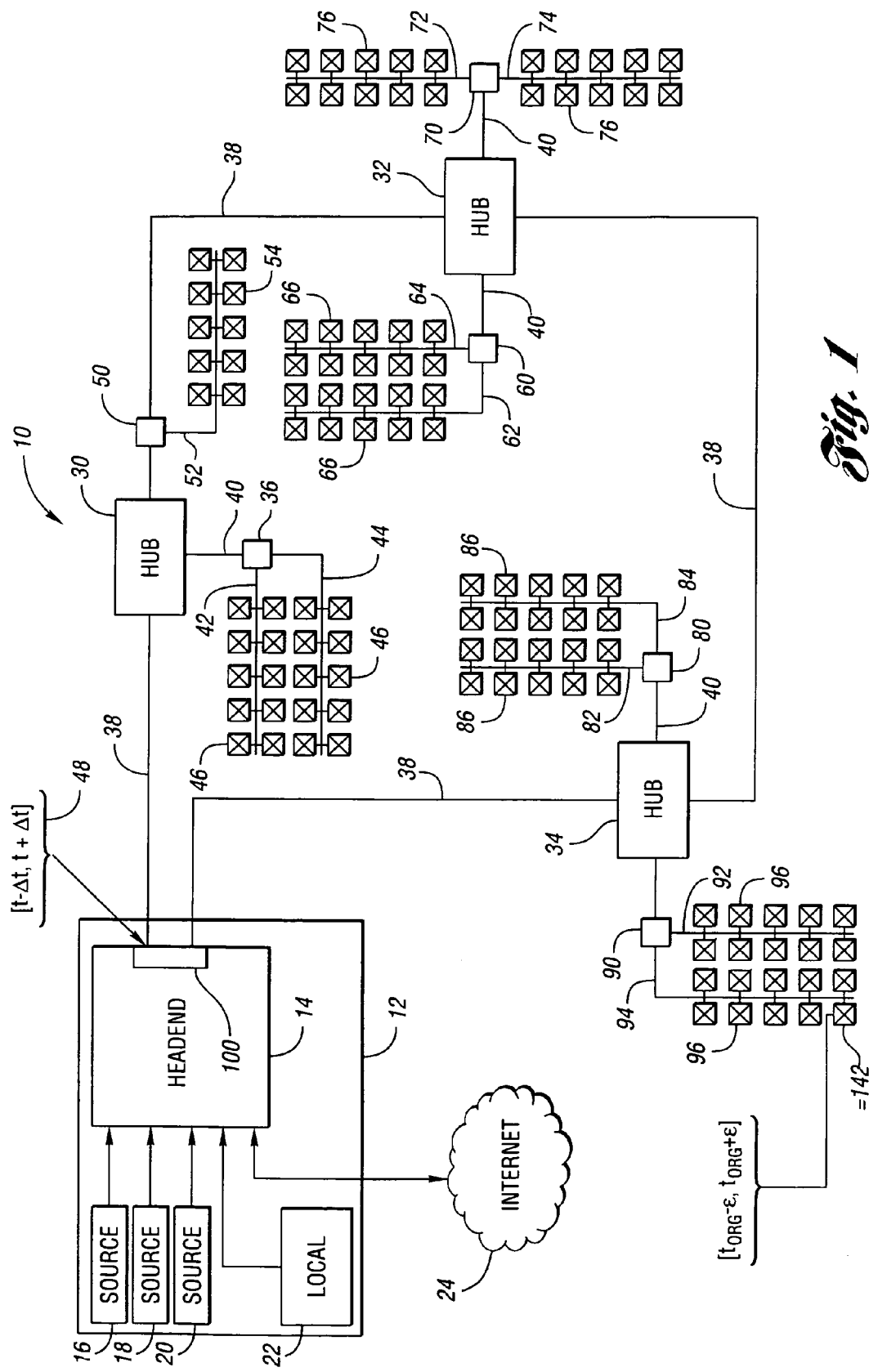
FIG. 1 is a system of the present invention for manipulating broadcast signals that utilizes either a sliding-window time range of the signal and/or a buffered storage queue at the headend.

With reference to FIG. 1, a system of the present invention for manipulating a broadcast signal is generally indicated at 10. System 10 includes a central office 12. A headend 14 is located at central office 12. Of course, depending on the size of the service area, it may be desirable to provide additional headends. For example, some large cities have two headends providing service. Headend 14 receives programming information from a variety of sources such as satellite dishes along a satellite dish bar, antennas, and landline communication paths. That is, information is received by headend 14 from, for example, sources 16, 18, 20. Further, local programming is received from a local programming source 22. Because some cable companies desire to provide Internet services, headend 14 may also receive information from the Internet 24. Preferably, two-way communication is possible between headend 14 and Internet 24 over the cable bandwidth. A simplified version of system 10 architecture is illustrated herein for convenience. Headend 14 distributes programming information to a plurality of hubs 30, 32, 34. Preferably, distribution to the hubs 30, 32, 34 takes place over a synchronous optical network (SONET) fiber ring 38.

The hubs 30, 32, 34, distribute the programming information to a plurality of nodes. Nodes are generally located in each neighborhood that is serviced. As shown, hub 30, distributes to node 36. Optoelectric conversion takes place at node 36, and the signals are then distributed over coax 42, 44 through the neighborhood to serve a number of customer residences 46. That is, the preferred embodiments of the present invention utilize a hybrid fiber coax (HFC) network implementation. However, it is appreciated that the present invention need not be limited to a particular network architecture. Hybrid fiber coax (HFC) is preferred so that the cable operator may keep the existing coax drops that run to the homes and the coax that runs to the network node, and then only upgrade the path from headend 14 to the network nodes (through the hubs) with fiber.

Hub 30 also serves node 50. Node 50 performs optoelectric conversion and the signal is then carried along coax 52. A plurality of physical drops come from coax 52 to serve a number of customer residences 54. Similarly, hub 32 serves network node 60. Again, the path from each hub 30, 32, 34 is preferably fiber 40. Optoelectric conversation takes place at node 60 and coax 62 and coax 64 run from node 60 to serve the neighborhood residences 66. Hub 32 also serves node 70. Node 70 performs optoelectric conversion and sends a signal out on coax 72 and coax 74 to serve a number of residences 76.

And lastly, before the fiber ring completes itself and connects back to headend 14, hub 34 serves network node 80 and network node 90. Node 80 has coax 82 and 84 that serve residences 86, while node 90 has coax 92 and coax 94 serving residences 96.

In accordance with a first embodiment of the present invention, signals are received at headend 14 from sources 16, 18, 20, 22, and/or 24. In this embodiment, a sliding-window time range 98 of the signal is established. The sliding-window time range, as shown, includes the current time, t, and ranges from a time before t, (t−Δt), to a time after time t, (t+Δt). Of course, the window need not be symmetric about current time t, and is shown that way for convenience.

At headend output 100, at least two streams are transmitted from the headend. The at least two streams are derived from the signal. Each stream originates from a corresponding different playback point in the sliding-window time range 98. That is, an end customer may choose either one of the at least two streams, which originate at different points in time. For example, a customer watching the stream that is near the forward end of the window, near (t+Δt), may wish to pause the programming.

Upon pausing the programming, the customer upon resuming programming would receive a different stream, which is further back in the window, near (t−Δt), to minimize missed programming. That is, if the customer pauses the programming for the same amount of time as the distance between the origination points of the two streams, no program will be missed as the customer pauses when viewing one stream and resumes viewing the other. As such, to increase the resolution of the customer playback point of origination choices, the number of streams transmitted must be increased. One embodiment of the invention is achieved by transmitting substantially all of the sliding-window time range of the signal from the headend to form a substantially continuous range of streams.

Figure 2:
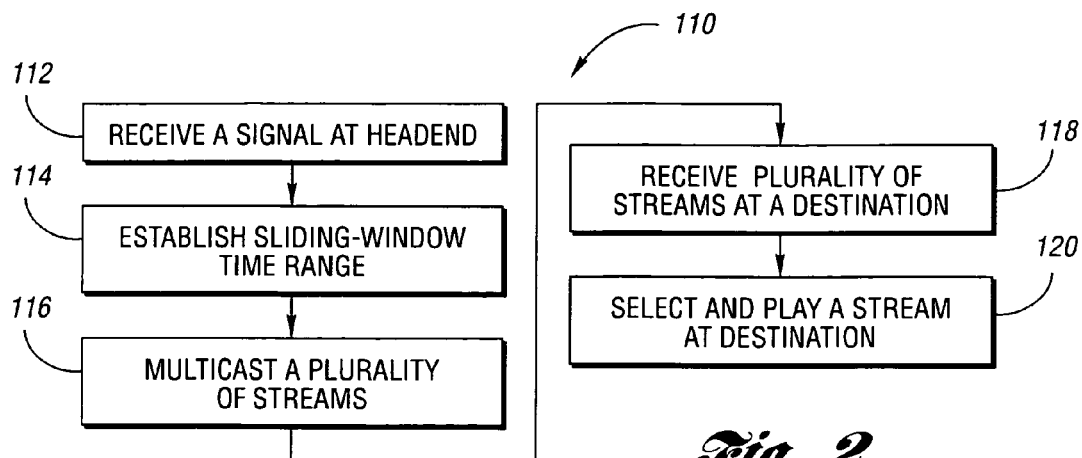
FIG. 2 is a block diagram illustrating a first method of the present invention for manipulating a broadcast signal that utilizes a sliding-window time range.

In the sliding-window embodiment of the present invention, all available streams in the sliding-window time range may be broadcasted all the way to each customer, with the customer selecting the desired stream from the available plurality, as best shown in FIG. 2.

FIG. 2 is a block diagram wherein a method of the present invention is generally indicated at 110. At block 112, signals are received at the headend. At block 114, a sliding-window time range is established (98, FIG. 1). At block 116, a plurality of streams are multicasted from the headend. That is, a plurality of streams within the sliding-window time range are broadcasted.

At block 118, the plurality of streams are received at the destinations. That is, as shown in FIG. 1, the plurality of streams are sent from headend 14 to hubs 30, 32, 34, and subsequentially distributed to all of the nodes and further distributed to all of the residences or destinations. With continuing reference to FIG. 2, at block 120, a stream is selected and played at the destination.

Figure 3:
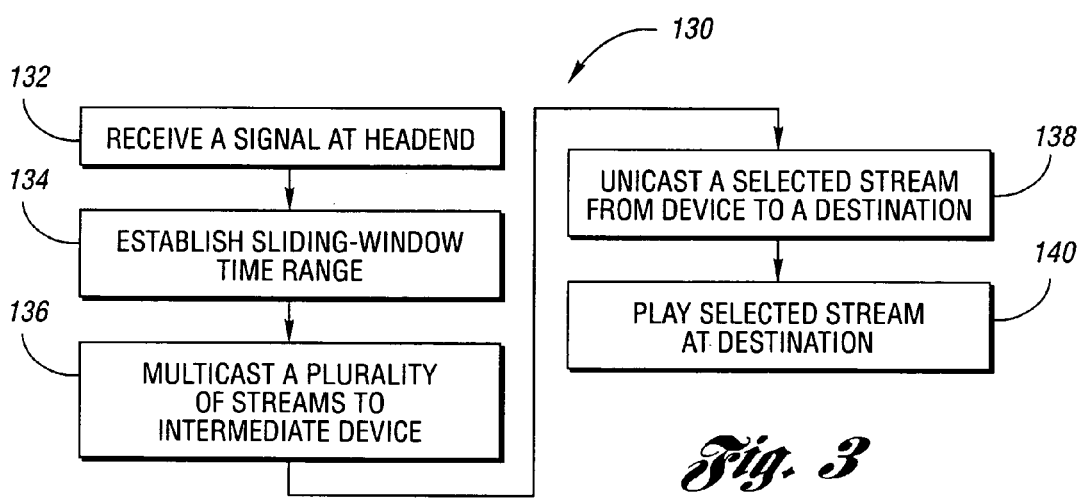
FIG. 3 is a block diagram illustrating a second method of the present invention that utilizes a sliding-window time range.

With reference now to FIG. 3, another method of the present invention is generally indicated at 130. At block 132, signals are received at the headend. At block 134, the sliding-window time range is established. At block 136, a plurality of streams are multicasted to an intermediate device, such as hubs 30, 32, 34 (FIG. 1).

Multicasting in this embodiment ends at the hubs, and a system is provisioned such that each end user may communicate with the appropriate hub. As such, the user selects the desired stream and that stream is unicasted from the hub to the customer. As shown in FIG. 3, at block 138, the selected stream is unicast from the intermediate device to the destination. And, at block 140, the selected stream is played at the destination. The selected stream may be indicated by, for example, a pointer type variable stored in a device at the customer site.

As can be appreciated, the difference between the embodiments shown in FIGS. 2 and 3 reflect differences in the desired economy of scale. As such, an embodiment of the present invention may multicast from the headend all the way to the destination, or may break off the multicasting of the sliding-window time range at some point and unicast from that point. For example, unicasts may take place at the hub, with the headend multicasting to the hubs.

Further, it is to be appreciated that both the embodiment of FIG. 2 and the embodiment of FIG. 3 may provide the end users with enhanced capabilities such as pause, rewind, and fast-forward. In response to a user at the selected destination requesting to pause, the current stream is incrementally switched to a different stream that originates earlier in the window than the current stream. That is, with reference again to FIG. 1, if a user is watching a stream that is near the front end (t+Δt) of the window, and presses pause, the user's selected stream will incrementally switch, moving toward the (t−Δt) end of the window. Because the selected stream is incrementally switching to streams originating earlier and earlier in the window, the rate of incremental switching may be arranged to take place at such a rate to cause a playback point to remain substantially stationary in time. That is, the window is advancing in time as programming continues, but the user's origination point is staying at the same time. As such, the ability to pause programming is limited to the distance between the current stream and the earliest point in time of the window.

Similarly, in response to a user of the destination requesting to rewind, the current stream is incrementally switched to a different stream that originates earlier in the window than the current stream. However, when rewind is requested, the incremental switching takes place at such at rate to cause the playback point to move backward in time. That is, as programming continues and the window moves forward, the rewinding customer playback point moves backward in time (opposite the direction of the window), or backward in the window faster than during pause.

And further, fast-forward is provided in response to a user at the destination requesting to fast-forward. During fast-forward, the current stream is incrementally switched to a different stream that originates later in the window than the current stream. In fast-forward, the incremental switching takes place at such a rate to cause the playback point to move forward in the window. That is, as this sliding-window moves forward in time (at the same rate as an origination point for a user that is watching the program), the fast-forwarding user's origination point moves forward in time at a rate faster than the window (moves forward in the window). That is, the window is advancing in time, while the origination point is moving toward the front of the window, advancing in time faster than the window.

As explained above, during programming distribution from the headend, a sliding-window is multicasted, and the sliding-window moves forward in time as the programming progresses. Playback is provided to a user by allowing the user to select an origination point within the window for the programming, and then moving that origination point forward in time at the same rate that the sliding-window moves forward in time. That is, the origination point is stationary with respect to the sliding-window.

Other features, such as pause, rewind, and fast-forward are provided by moving the origination point for a customer with respect to the sliding-window, as the sliding-window moves forward in time. That is, pause is provided by moving the origination point backward within the window, as the window moves forward in time (that is, the origination point is stationary in time, but moving backward with respect to the window). During rewind, the origination point moves backward in time. And in fast-forward, the origination point moves forward in time. That is, during fast-forward, the origination point moves forward in time faster than the sliding-window is moving forward in time.

Further, additional capabilities may be provided by implementing a buffered storage queue 142 (FIG. 1) at the customer residence. Buffered storage queue 142 will function in the same manner as the sliding-window discussed above. That is, the buffered storage queue is a sliding-window ranging from the selected origination time less some value to the origination time plus some value. As shown, the window is symmetric about $t_{ORG}$, and has a total length of $2\epsilon$. Of course, it is appreciated that the window need not be symmetric, as sliding-window 98 also need not be symmetric.

In this embodiment, with the buffered storage queue 142 at the customer residence, the customer is basically given a window within a window. For example, small adjustments to playback position may be made in the buffered storage queue at the user residence. However, when the playback point moves all the way to one extreme end of the buffered storage queue, the origination point within sliding-window 98 may be moved to cause the playback point within buffered storage queue 142 to move back toward the middle of that interval.

For example, upon a user requesting to pause programming, the playback point within storage buffer 142 moves backward until reaching the earliest point in the queue, at which point the origination point in sliding-window 98 begins to move backward. Upon resume, the origination point may be selected at a position within sliding-window 98 such that the playback point within buffered storage queue 142 is moved away from the extreme ends of the queue.

Figure 4:
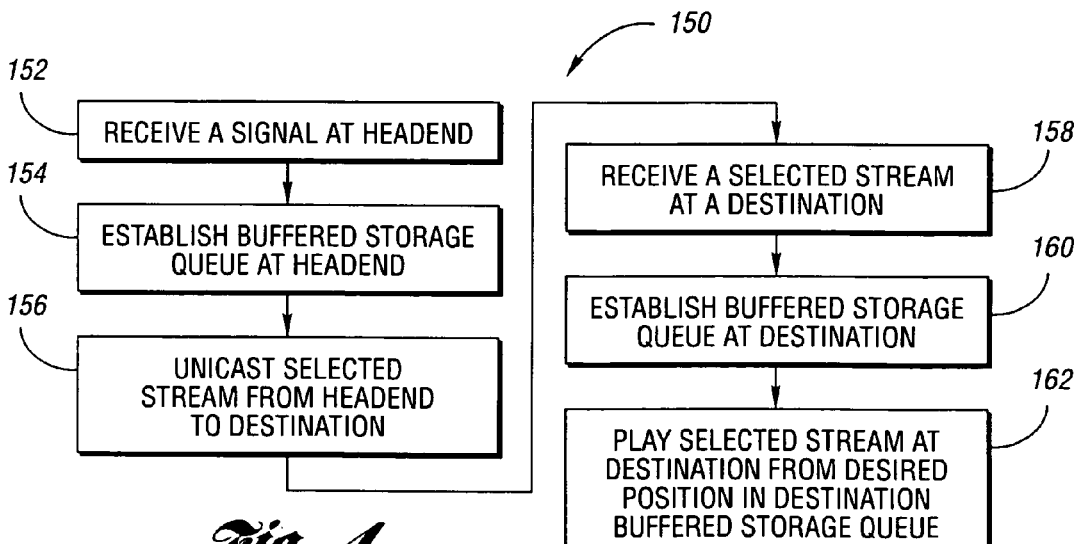
FIG. 4 is a block diagram illustrating a third method of the present invention that utilizes a buffered storage queue at the headend.

With reference to FIG. 4, another method of the present invention is generally indicated at 150, at block 152, signals are received at the headend. At block 154, a buffered storage queue is established at the headend. At block 156, a selected stream is unicasted to a destination, from the headend. That is, there is no multicasting and the unicasting occurs at the headend. At block 158, a selected stream is received at the destination. The embodiments of FIGS. 2, 3, and 4 can be thought of as a continuum where the unicasting point moves from non-existent or at the residence (FIG. 2), to the hub (FIG. 3), or all the way back to the headend (FIG. 4).

Further, the embodiment shown in FIG. 4 may be enhanced by adding buffered storage queue capabilities at the destination, as indicated at block 160. As such, at block 162, the selected stream (from the selective origination point in the buffered storage queue at the headend) is played at the destination, from a desired position in the destination buffered queue.

Embodiments of the present invention are advantageous and that a user may stop a television program when he or she wants, and the video information is available so that the viewer can resume watching without missing any programming. Advantageously, the user may pause live television, and features such as instant replay and fast-forwarding through commercials are provided. In the embodiments that utilize multicasting, the program delayed at different offsets (the streams) could all be stored in the same 6 megahertz channel. Appropriately, the viewer selects the closest stream that allows him or her to continue viewing the program where he or she left off after a pause.

Alternatively, when multicasting from the head end is not employed, the user can select the appropriate place in a buffered storage queue at the headend to resume watching programming where he or she left off after a pause. Advantageously, embodiments of the present invention integrate enhanced capabilities, which may be referred to as video caching within the headend server. This provides economy of scale and eliminates the requirement of a custom set top box. This invention may be applied to broadcast streams including video feeds and audio feeds, or other multimedia signals, and can be applied regardless of whether the signals are being sent via cable, Internet, phoneline, airwaves, etc.

While the best mode for carrying out the invention has been described in detail, those familiar with the art to which this invention relates will recognize various alternative designs and embodiments for practicing the invention as defined by the following claims.

What is claimed is:

1. A method for manipulating a traditional television program live broadcast signal in a communication system including a headend that receives the traditional television program live broadcast signal and that sends programming to a plurality of hubs with each hub sending the programming to at least one node that distributes the programming to end users, the method comprising:

receiving the traditional television program live broadcast signal at the headend for broadcast distribution to the end users;

establishing a buffered storage queue at the headend that receives the signal; and transmitting a stream from the headend, the stream passing through a hub and through a node to reach an end user, the stream being derived from the traditional television program live broadcast signal, and the stream originating from a user selected playback point in the buffered storage queue whereby the traditional television live broadcast signal is distributed to the user and wherein user selection of the playback point allows the user to manipulate an otherwise traditional television program live broadcast signal.

2. The method of claim 1 wherein transmitting the stream further comprises:

unicasting a plurality of streams, each steam being derived from the signal, and each stream originating from a corresponding user selected playback point in the storage queue.

3. The method of claim 1 wherein the stream is being received and played at a destination, the method further comprising:

in response to a user at the destination requesting to pause, sliding the user selected playback point within the queue at such a rate to cause the playback point to remain substantially stationary in time; and in response to a user at the destination requesting to resume, stopping the sliding.

4. The method of claim 1 wherein the stream is being received and played at a destination, the method further comprising:

in response to a user at the destination requesting to rewind, sliding the user selected playback point within the queue at such a rate to cause the playback point to move backward in time; and in response to a user at the destination requesting to resume, stopping the sliding.

5. The method of claim 1 wherein the stream is being received and played at a destination, the method further comprising:

in response to a user at the destination requesting to fast-forward, sliding the user selected playback point within the queue at such a rate to cause the playback point to move forward in time; and in response to a user at the destination requesting to resume, stopping the sliding.

6. The method of claim 1 wherein the stream has a destination, and wherein the method further comprises:

receiving the stream at the destination;

establishing a buffered storage queue at the destination that receives the stream; and in response to a user selecting a desired position in the destination buffered storage queue, playing the stream at the destination from the desired position in the destination buffered storage queue.

7. A system for manipulating a traditional television program live broadcast signal, the system comprising:

a communication system including a headend, a plurality of hubs and a plurality of nodes that distribute programming to end users, the headend receiving the traditional television program live broadcast signal for broadcast distribution to the end users, the headend being operative to establish a buffered storage queue at the headend, and the headend being further operative to transmit a stream from the headend, the stream passing through a hub and through a node to reach an end user, the stream being derived from the traditional television program live broadcast signal, and the stream originating from a user selected playback point in the buffered storage queue whereby the traditional television live broadcast signal is distributed to the user and wherein user selection of the playback point allows the user to manipulate an otherwise traditional television program live broadcast signal.

\* \* \* \* \*